US010377570B2

(12) United States Patent
Dirkmann et al.

(10) Patent No.: US 10,377,570 B2
(45) Date of Patent: Aug. 13, 2019

(54) DEVICE FOR MERGING TWO PIECE GOODS STREAMS ARRANGED AT DIFFERENT HEIGHTS

(71) Applicant: BEUMER Group GmbH & Co. KG, Beckum (DE)

(72) Inventors: Markus Dirkmann, Oyten (DE); Markus Wöhe, Recklinghausen (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 16/201,466

(22) Filed: Nov. 27, 2018

(65) Prior Publication Data

US 2019/0185268 A1 Jun. 20, 2019

(30) Foreign Application Priority Data

Dec. 14, 2017 (EP) .................................... 17207274

(51) Int. Cl.
*B65G 11/08* (2006.01)
*B65G 47/68* (2006.01)
(Continued)

(52) U.S. Cl.
CPC ............ *B65G 11/083* (2013.01); *B65G 47/66* (2013.01); *B65G 47/681* (2013.01); *B65G 11/186* (2013.01)

(58) Field of Classification Search
CPC ..... B65G 11/083; B65G 11/186; B65G 11/12; B65G 11/123; B65G 11/126; B65G 11/08;
(Continued)

(56) References Cited

U.S. PATENT DOCUMENTS 1,969,276 A * 8/1934 Pevear ..................... B65G 1/08 193/35 F
3,221,857 A * 12/1965 Keller .................... B65G 47/24 193/46

(Continued)

*Primary Examiner* — Mark A Deuble
(74) *Attorney, Agent, or Firm* — Ganz Pollard, LLC

(57) ABSTRACT

Device for merging at least two piece goods streams arranged at different heights, with an upper feed channel for receiving packages from an upper piece goods stream, and a lower feed channel for receiving packages from a lower piece goods stream, the feed channels extending between a first vertical plane and a parallel second vertical plane, whose distance from each other corresponds to a total channel width, the upper feed channel having a first conveying surface between a first side panel running in the first vertical plane, and a second side panel, the second side panel running in the second vertical plane at least on an upstream-side final section, and a second conveying surface, which downstream joins the first conveying surface adjacent to a third side panel running in the first vertical plane and has a width, which is less than half the total channel width, wherein the second conveying surface loosely ends on a side panel running parallel to the first vertical plane at a vertical distance above the lower feed channel, the lower feed channel having a third conveying surface, which is bordered by a fourth side panel running in the second vertical plane and by a fifth side panel, wherein a width of the third conveying surface at a downstream-side end of the lower feed channel corresponds to the total channel width less the width of the second conveying surface.

15 Claims, 3 Drawing Sheets

(51) Int. Cl.
*B65G 47/66* (2006.01)
*B65G 11/18* (2006.01)

(58) Field of Classification Search
CPC ... B65G 11/081; B65G 11/085; B65G 11/086; B65G 11/088; B65G 47/681; B65G 47/66
USPC .................. 198/448, 452, 453, 347.4, 369.7
See application file for complete search history.

(56) References Cited

U.S. PATENT DOCUMENTS

| | | | | | |
|---|---|---|---|---|---|
| 3,580,141 | A * | 5/1971 | Richter | B65H 29/16 | 198/341.05 |
| 3,612,268 | A * | 10/1971 | Jackson | B65G 47/24 | 193/47 |
| 4,033,441 | A * | 7/1977 | Pataki | B65G 47/681 | 193/38 |
| 6,068,106 | A * | 5/2000 | Brizzi | B65G 47/681 | 198/448 |
| 2006/0088404 | A1* | 4/2006 | Lafontaine | B65G 1/08 | 414/791.6 |
| 2007/0029165 | A1* | 2/2007 | Bender | B65G 47/648 | 198/358 |
| 2010/0170771 | A1* | 7/2010 | Ripkens | B65G 17/005 | 198/890.1 |
| 2014/0332344 | A1* | 11/2014 | Jodoin | B65G 47/90 | 198/448 |
| 2017/0334647 | A1* | 11/2017 | Hartmann | B07C 3/06 | |
| 2018/0273309 | A1* | 9/2018 | Heitplatz | B65G 21/2054 | |
| 2019/0092566 | A1* | 3/2019 | Barbre | B65G 11/086 | |

* cited by examiner

DEVICE FOR MERGING TWO PIECE GOODS STREAMS ARRANGED AT DIFFERENT HEIGHTS

BACKGROUND

The invention relates to a device for merging two-piece goods streams arranged at different heights or also vertically above one another, with an upper feed channel for receiving packages from an upper piece goods stream and a lower feed channel for receiving packages from a lower piece goods stream. In an exemplary embodiment the merging device can concern a terminal and the piece goods streams can concern conveying devices or sorting devices, wherein a sorting device provided with such a terminal consists of at least one upper and one lower sorting device. Preferably the sorting devices have conveying directions, which are opposed to each other. Conceivably the conveying directions could also be the same.

In the case of such a device, the feed channels of which extend between a first vertical plane and a parallel second vertical plane, whose distance from each other corresponds to a total channel width of the device, it is difficult to merge the feed channels in an advantageous way in order to direct the packages from the piece goods streams downstream to a discharge channel. In the case of a well-known embodiment the feed channels are merged next to each other, each feed channel having a width, which corresponds to half the total channel width. In the case of such an embodiment it can relatively easily happen that packages, the largest dimension of which is greater than half the total channel width, get jammed in a feed channel when being unloaded, possibly leading to substantial operational problems.

SUMMARY

The object of the invention consists of creating a device for merging at least two-piece goods streams arranged at different heights or above one another, wherein the danger of packages getting jammed in a feed channel is reduced.

This object is achieved according to the invention by a device for merging at least two piece goods streams arranged at different heights, with an upper feed channel for receiving packages from an upper piece goods stream, and a lower feed channel for receiving packages from a lower piece goods stream, the feed channels extending between a first vertical plane and a parallel second vertical plane, whose distance from each other corresponds to a total channel width, the upper feed channel having a first conveying surface between a first side panel running in the first vertical plane and between a second side panel, wherein the second side panel runs in the second vertical plane at least on an upstream-side final section, pointing toward the first piece goods stream and a second conveying surface, which downstream joins the first conveying surface adjacent to a third side panel running in the first vertical plane, pointing away from the second piece goods stream, and has a width, which is less than half the total channel width, wherein the second conveying surface loosely ends on a side edge running parallel to the first vertical plane at a vertical distance above the lower feed channel, the lower feed channel having a third conveying surface, which is bordered by a fourth side panel running in the second vertical plane and by a fifth side panel, wherein a width of the third conveying surface at a downstream-side end of the lower feed channel corresponds to the total channel less the width of the second conveying surface. Downstream-side ends of the second conveying surface and of the third conveying surface can join a discharge channel, which extends between the vertical planes for receiving packages from the upper and the lower feed channel.

The second conveying surface joins the first conveying surface preferably without gaps and with a downward gradient equally great, greater or smaller in relation to the first conveying surface. The width of the second conveying surface is preferably constant throughout its length.

Although the second conveying surface has less width than half the total channel width, packages, the width of which is greater than that of the second conveying surface and which can amount to a dimension corresponding to the total channel width, can be conveyed thereon, since the second conveying surface loosely ends on its side edge running at a distance from or parallel to the first vertical plane and larger packages can project over this side edge. Since the lower feed channel and/or the third conveying surface possesses a width, which is greater than the half total channel width, packages, the width of which is greater than half the total channel width, can also be transported in this channel, so that any jamming of packages is effectively counteracted.

The second side panel can run completely in the second vertical plane, whereby it can be proposed that the first conveying surface has a downstream-side final section located between the second side panel and the side edge of the second conveying surface, which is arranged above the lower feed channel and/or the third conveying surface at a vertical distance. Packages, which in individual cases despite their original conveying speed prevailing in piece goods streams, during the unloading operation, do not abut against the first side panel and and do not reach the second conveying surface, can then fall from the downstream-side final section of the first conveying surface onto the lower feed channel or onto the third conveying surface. Alternatively it is possible that the second side panel runs acutely to the second vertical plane and originating from the second vertical plane extends toward the second conveying surface. This variant has the advantage that the arriving packages in each case are directed onto the second conveying surface, wherein however there is some possibility that individual packages get jammed under certain circumstances.

The first conveying surface can have a downstream-side final section located between the second side panel and the side edge, which is arranged above the lower feed channel and/or the third conveying surface at a vertical distance.

The fifth side panel can run from an initial position, located in the first vertical plane, to a final position, located vertically under the side edge of the second conveying surface, for instance in a straight line or arc-shape. The fifth side panel can have a transition section running acutely to the first vertical plane, and a guide section running parallel to the first vertical plane, whose distance from the first vertical plane of which corresponds to the width of the second conveying surface.

It may be proposed that the first conveying surface is arranged horizontally, i.e. perpendicularly to the first and second vertical plane. Furthermore it may be proposed that the second conveying surface is arranged diagonally sloping either perpendicularly to the first vertical plane or at an angle to the first vertical plane or third side panel. Accordingly, it is possible that a sub-section of the first conveying surface, which originating from the first vertical plane or first side panel has the same width as the second conveying surface, is arranged sloping either perpendicularly to the first vertical plane or first side panel or however at an angle diagonally to the first vertical plane or first side panel. The aforesaid angle can amount for example to between 5° and 30°, so that a kind of conveying gutter for packages is formed.

It is expediently proposed that the lower conveying surface is arranged perpendicularly to the vertical planes.

The discharge channel preferably has a fourth conveying surface running horizontally or perpendicularly to the vertical planes.

A downstream-side final section of the second conveying surface is preferably arranged at the same height as a downstream-side final section of the third conveying surface, in order to ensure problem-free transition of the packages to the discharge channel and/or the fourth conveying surface. Expediently the two final sections are at a same longitudinal position, so that the fourth conveying surface can join the second and third conveying surface without gaps.

The first conveying surface and/or, so far as available, the sub-section of the first conveying surface and/or the second conveying surface and/or the third lower conveying surface and/or the fourth conveying surface in each case can be formed as sliding surface, sliding metal sheet or chute, driven or passive roller track or band- or belt-conveyor.

Preferably it is proposed that the first conveying surface, so far as available, the sub-section of the first conveying surface and the second conveying surface have a downward gradient. The third conveying surface can have a downward gradient or be arranged horizontally.

The device for merging piece goods streams can be associated with at least one upper sorting device and at least one lower sorting device, wherein the piece goods streams are designed as sorting devices and wherein the sorting devices can be located vertically one above another or at a horizontal distance from each other. The sorting devices can be formed as crossbelt sorters.

It may be proposed that the sorting devices are operable in the same or opposite conveying directions.

It is expediently proposed that the vertical planes are arranged perpendicularly to the conveying directions.

The invention is described below on the basis of exemplary embodiments, reference being made to a drawing, wherein

DETAILED DESCRIPTION

Figure 1:
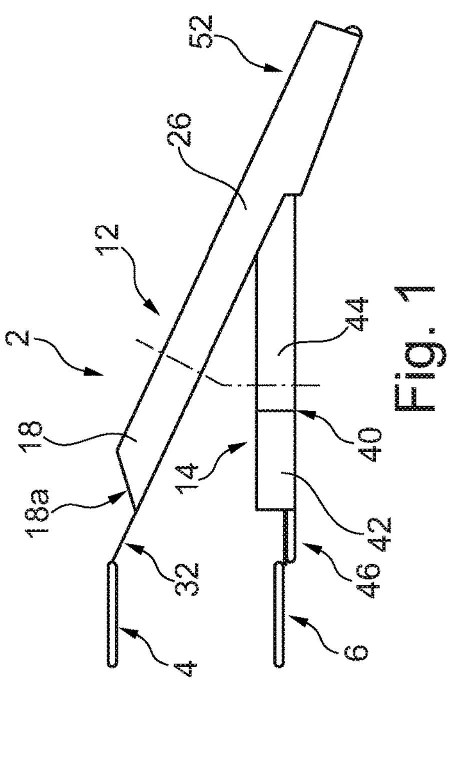
FIG. 1 shows a schematic side view of a device according to the invention in the form of a terminal adjacent to an upper and a lower sorting device.
Figure 2:
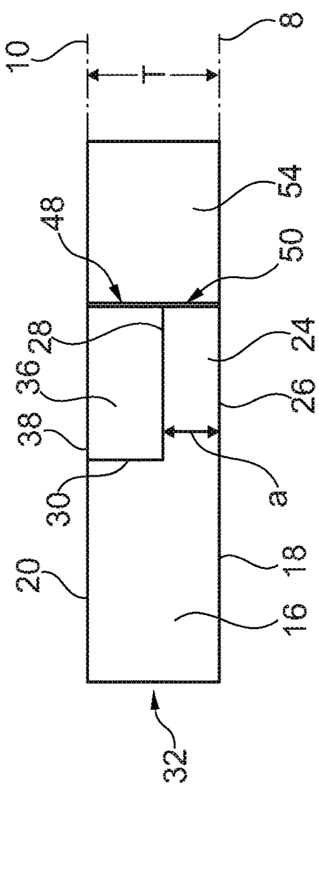
FIG. 2 shows a plan view onto the device.

Initially a first embodiment of the invention is described on the basis of FIGS. 1 to 6. The inventive device in the form of a terminal 2 serves to receive packages from at least two-piece goods streams arranged at different heights or also vertically above one another, which are designated in FIG. 1 with 4 and 6 and are designed as sorting devices by way of example. In place of one or both sorting devices any conveying system or device could be present to create piece goods streams, wherein individual packages are conveyed on two tracks, which are to be combined into a single conveyed goods stream. In the illustrated embodiment an upper sorting device 4 is arranged vertically above a lower sorting device 6, the conveying directions of which run horizontally, perpendicularly to the drawing plane. The sorting devices can be formed for example as crossbelt sorters, wherein a load receiving device which can be driven transversely to the conveying direction is located on a driving car or a sorter element in each case, with which individual packages can be unloaded at the terminal 2 horizontally and transversely to the conveying direction. Usually a number of terminals are arranged, seen in the conveying direction, one behind the other adjacent to the sorting devices, wherein the sorting operation takes place with selection of a specific terminal. In each case a terminal and in particular terminal 2 illustrated in FIG. 1 is located between two vertical planes spaced apart, a first vertical plane 8 and a second vertical plane 10 located therefrom at a distance T, which is also called total channel width of the terminal. The vertical planes 8, 10 are preferably arranged perpendicularly to the conveying directions of the sorting devices 4, 6.

Figure 4:
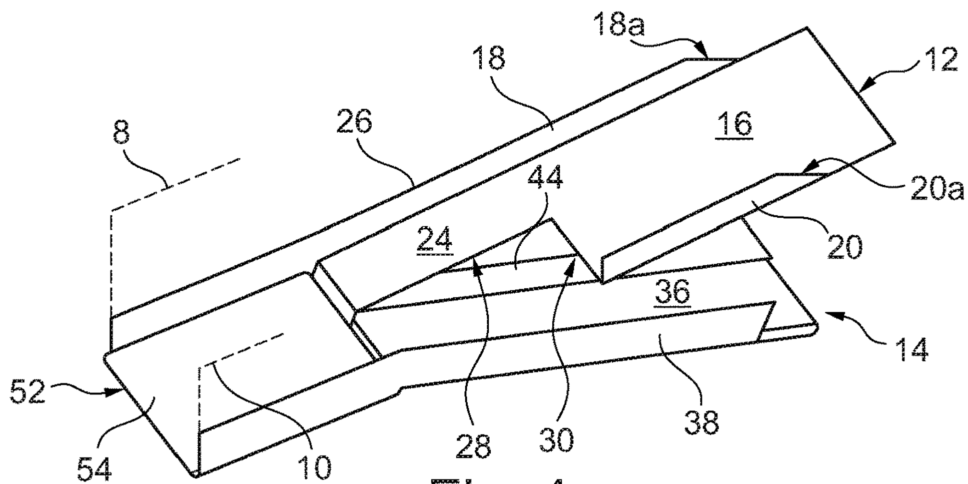
Figure 5:
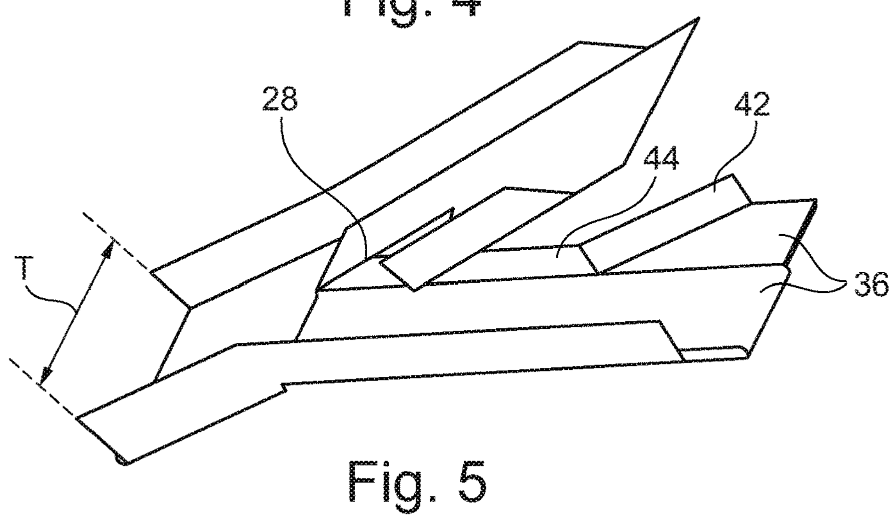
Figure 6:
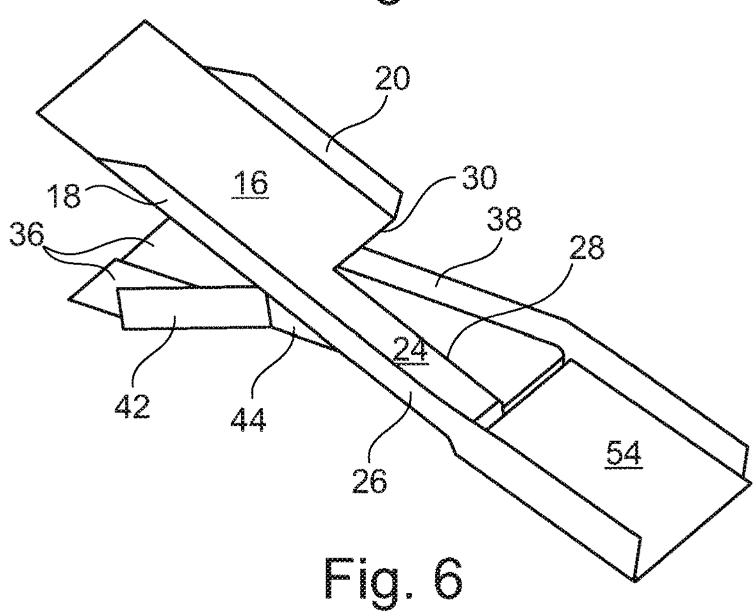

The fundamental structure of the terminal 2 forming a sorting element is clearest from the perspective views in accordance with FIGS. 4 to 6. The terminal 2 possesses an upper feed channel 12 for receiving packages from the upper sorting device 4 and a lower feed channel 14 for receiving packages from the lower sorting device 6. The upper feed channel 12 has a first conveying surface 16, which is bordered by a first side panel 18 running in the first vertical plane 8 and by a second side panel 20 running in the second vertical plane 10. Furthermore, the upper feed channel 12 joining the first conveying surface 16 has a second conveying surface 24, which is bordered by a third side panel 26 running in the first vertical plane 8. The third side panel 26 can directly join the first side panel 18. The second conveying surface 24 has a side edge 28, on which it loosely ends. The side edge 28 runs parallel to the first connecting plane 8 and has a distance a therefrom, which corresponds to a width of the second conveying surface 24 and is less than half the total channel width T. The first conveying surface 16 has a width, which corresponds to the total channel width T and has a downstream-side final section 30 between the second side panel 20 and the side edge 28 of the second conveying surface 24, which ends at a vertical distance above the lower feed channel 14.

The first side panel 18 and the second side panel 20 end with upstream-side final sections 18*a*, 20*a* in each case at a distance from an upstream-side final section 32 of the first conveying surface 16, in order to enable packages unloaded transversely to the conveying direction from the upper sorting device 4 to pass through a curved trajectory which is expedient for higher conveying and unloading speeds.

The upstream-side final section 32 of the first conveying surface 16 is arranged directly adjacent to the upper sorting device 6 when the terminal is used, as the side view according to FIG. 1 shows.

The lower feed channel 14 has a third conveying surface 36, which is bordered by a fourth side panel 38 running in the second vertical plane 10 and a fifth side panel 40. The fifth side panel 40 runs from an initial position, located in the first vertical plane 8, to a final position located vertically under the side edge 28 of the second conveying surface 24, wherein it has a transition section 42 running acutely to the first vertical plane 8 and a guidance section 44 joining it, running parallel to the first vertical plane 8, whose distance from the first vertical plane corresponds to the width of the second conveying surface 24. The fourth side panel 38 and the fifth side panel 40 begin at a distance from an upstream-side final section 46 of the third conveying surface 36, which is located adjacent to the lower sorting device 6, as FIG. 1 also shows, in order, as described above with respect to the first and second side panel of the first conveying surface 16, to render advantageous unloading of the packages possible.

A downstream-side final section 48 of the third conveying surface 36 is located at the same height and directly adjacent to a downstream-side final section 50 of the second conveying surface 24, wherein a discharge channel 52 with a fourth conveying surface 54 joins the second conveying surface 24 and the third conveying surface 36 and/or their downstream-side final sections 48, 50. The fourth conveying surface 54 extends over the full width or the total channel width T of the terminal 2, between the vertical planes 8, 10 and between side panels running therein, which can join the third and fourth side panels 26, 38 of the second and third conveying surfaces 24, 36 without gaps.

Figure 3:
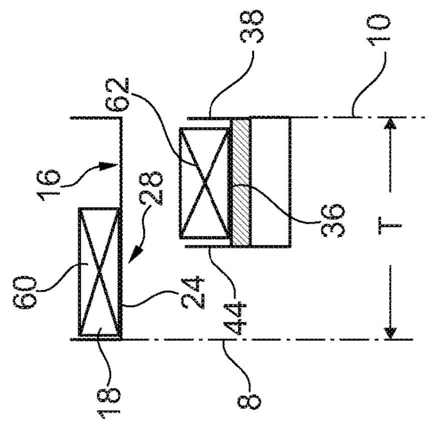
FIG. 3 shows a cutaway view along line III-III in FIG. 1, FIGS. 4 to 6 show perspective views of the device from different directions.

FIG. 3 in a cutaway view describes how packages, which can be wider than half the width or half the total channel width of the terminal 2, can be easily unloaded from the sorting devices on the upper feed channel and the lower feed channel. FIG. 3 at the top of the illustration shows a package 60, which is located on the second conveying surface 24 lying against the third side panel 26, wherein it laterally projects due to its width over the second conveying surface 24 and its side edge 28. Correspondingly FIG. 3 in the lower part of the illustration shows a packager 62 on the third conveying surface 36, wherein its width and/or the distance from each other of the fourth and fifth side panels 38, 40 is greater than half the total channel width T. FIG. 3 also shows that the side edge 28 of the second conveying surface 24 is located vertically above the fourth side panel 38 of the third conveying surface 36. The plan view in accordance with FIG. 2 likewise clearly shows the width dimensions of the first conveying surface 16, the second conveying surface 24 and the third conveying surface 36, as well as the discharge channel 52 with the fourth conveying surface 54.

Figure 7:
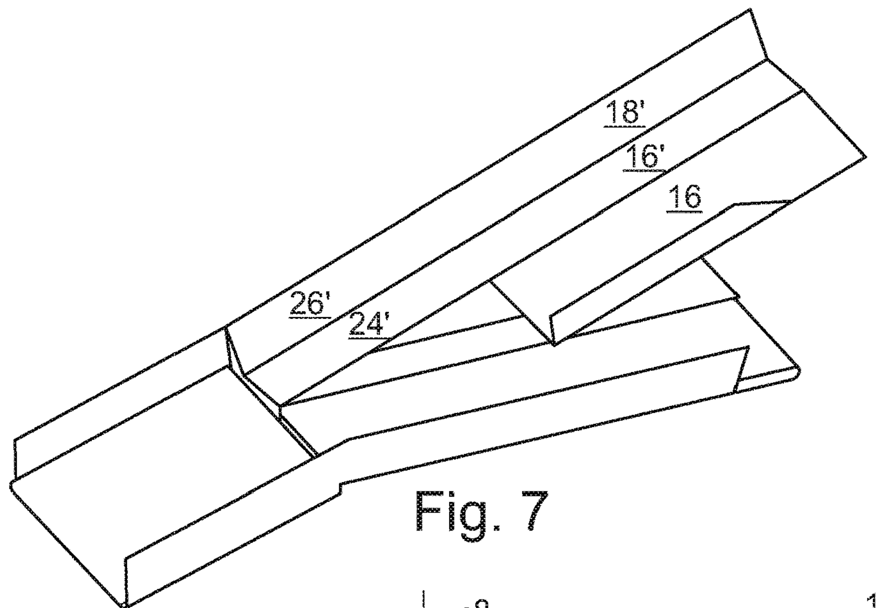
FIG. 7 shows a perspective view similar to FIG. 4 of an alternative embodiment.
Figure 9:
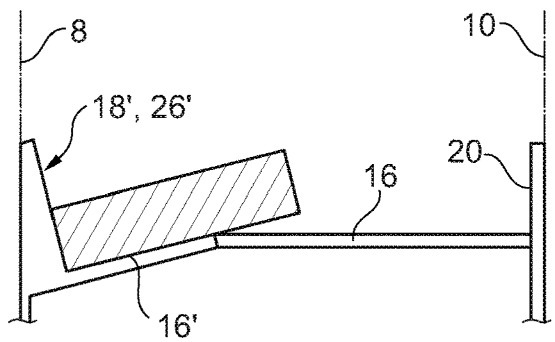
FIG. 9 shows a cutaway view along line IX-IX in FIG. 8, wherein packages are additionally illustrated.
Figure 8:
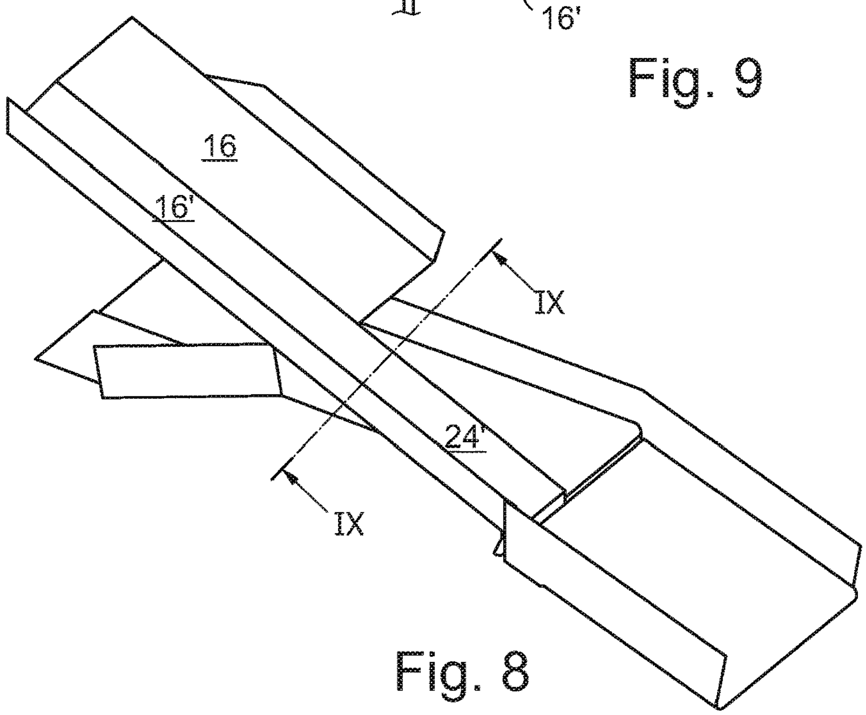
FIG. 8 shows a further perspective view of the embodiment according to FIG. 7.

FIGS. 7 to 9 describe a second embodiment, wherein by contrast to the embodiment described above the second conveying surface 24' and a sub-section 16' of the first conveying surface 16 do not run perpendicularly to the vertical planes 8, 10 but, originating from the first conveying surface 16 and/or the plane defined thereby, are arranged diagonally sloping toward the first vertical plane 8. FIG. 9 by way of example shows an arrangement, wherein the second conveying surface 24' and the sub-section 16' of the first conveying surface run sloping toward the first vertical plane 8 at an angle of approx. 15° in relation to the first conveying surface 16. Furthermore FIGS. 7 to 9 show that the first side panel 18' and the third side panel 26' can also be arranged at an angle to the first vertical plane 8, so that they run orthogonally to the diagonally running second conveying surface 24' and to the sub-section 16' of the first conveying surface 16. As FIG. 9 shows, packages, which are frequently square in shape, can then be conveyed particularly advantageously.

The invention claimed is:

1. Device for merging at least two piece goods streams arranged at different heights, with an upper feed channel for receiving packages from an upper piece goods stream, and a lower feed channel for receiving packages from a lower piece goods stream, the feed channels extending between a first vertical plane and a parallel second vertical plane, whose distance from each other corresponds to a total channel width, the upper feed channel having a first conveying surface between a first side panel, running in the first vertical plane, and a second side panel, the second side panel running in the second vertical plane at least on an upstream-side final section, and a second conveying surface, which downstream joins the first conveying surface adjacent to a third side panel running in the first vertical plane and has a width, which is less than half the total channel width, wherein the second conveying surface, loosely ends on a side panel running parallel to the first vertical plane at a vertical distance above the lower feed channel, the lower feed channel having a third conveying surface, which is bordered by a fourth side panel running in the second vertical plane and by a fifth side panel, wherein a width of the third conveying surface at a downstream-side end of the lower feed channel corresponds to the total channel width less the width of the second conveying surface.

2. Device according to claim 1, characterized in that the second side panel runs completely in the second vertical plane.

3. Device according to claim 1, characterized in that the second side panel runs acutely to the second vertical plane and originating from the second vertical plane can extend toward the second conveying surface.

4. Device according to claim 1, characterized in that the first conveying surface has a downstream-side final section arranged between the second side panel and the side edge, which is located at a vertical distance above the lower feed channel.

5. Device according to claim 1, characterized in that the fifth side panel runs from an initial position located in the first vertical plane to an end position arranged vertically at the side edge of the second conveying surface.

6. Device according to claim 1, characterized in that the fifth side panel has a transition section running acutely to the first vertical plane and a joining guidance section running parallel to the first vertical plane, whose distance from the first vertical plane corresponds to the width of the second conveying surface.

7. Device according to claim 1, characterized in that the first conveying surface is arranged perpendicularly to the first and second vertical plane.

8. Device according to claim 1, characterized in that the second conveying surface is arranged perpendicularly to the first vertical plane or sloping diagonally at an angle to the first vertical plane.

9. Device according to claim 8, characterized in that a sub-section of the first conveying surface, which originating from the first vertical plane as the same width as the second conveying surface, is arranged either perpendicularly to the first vertical plane or sloping diagonally at an angle to the first vertical plane.

10. Device according to claim 1, characterized in that the third conveying surface is arranged perpendicularly to the vertical planes.

11. Device according to claim 1, characterized in that a downstream-side final section of the second conveying surface is arranged at the same height as a downstream-side final section of the third conveying surface.

12. Device according to claim 1, characterized in that a discharge channel for receiving packages from the upper feed channel and from the lower feed channel extends between the vertical planes, has a fourth conveying surface running perpendicularly to the vertical planes.

13. Device according to claim 1, characterized in that in each case the first conveying surface and/or so far as available, the sub-section of the first conveying surface and/or the second conveying surface and/or the third conveying surface and/or the fourth conveying surface is formed as a sliding surface, sliding metal sheet, chute, driven or passive roller track or band- or belt-conveyor.

14. Device according to claim 1, characterized in that the first conveying surface, so far as available the sub-section of the first conveying surface and the second conveying surface have a downward gradient.

15. Device according to claim 1, characterized in that the device is associated with an upper sorting device and a lower sorting device.

* * * * *